(12) United States Patent
Zaveri et al.

(10) Patent No.: US 9,877,082 B2
(45) Date of Patent: Jan. 23, 2018

(54) ADDRESSABLE REALTIME MESSAGING FOR TELEVISION RECEIVERS

(71) Applicant: ECHOSTAR TECHNOLOGIES L.L.C., Englewood, CO (US)

(72) Inventors: Sagar Zaveri, Englewood, CO (US); Pawan Lakshmanan, Englewood, CO (US); Keith Gerhards, Englewood, CO (US)

(73) Assignee: EchoStar Technologies LLC, Englewood, CA (US)

( * ) Notice: Subject to any disclaimer, the term of this patent is extended or adjusted under 35 U.S.C. 154(b) by 0 days.

(21) Appl. No.: 13/836,824

(22) Filed: Mar. 15, 2013

(65) Prior Publication Data

US 2014/0282694 A1  Sep. 18, 2014

(51) Int. Cl.
*H04N 21/488* (2011.01)
*H04L 12/18* (2006.01)
*H04H 60/76* (2008.01)
*H04N 21/235* (2011.01)

(52) U.S. Cl.
CPC ........ *H04N 21/4882* (2013.01); *H04H 60/76* (2013.01); *H04L 12/1859* (2013.01); *H04H 2201/37* (2013.01); *H04H 2201/70* (2013.01); *H04L 12/1895* (2013.01); *H04N 21/235* (2013.01)

(58) Field of Classification Search
CPC .............. H04N 21/4882; H04N 21/235; H04L 12/1859; H04L 12/1895; H04H 60/76; H04H 2201/70; H04H 2201/37; G06F 9/44

See application file for complete search history.

(56) References Cited

U.S. PATENT DOCUMENTS

| | | | |
|---|---|---|---|
| 7,974,966 B2 | 7/2011 | Robie | |
| 2002/0144273 A1* | 10/2002 | Reto | 725/86 |
| 2003/0014477 A1 | 1/2003 | Oppenheimer et al. | |
| 2005/0028208 A1* | 2/2005 | Ellis et al. | 725/58 |
| 2005/0262542 A1* | 11/2005 | DeWeese et al. | 725/106 |
| 2009/0013079 A1* | 1/2009 | Dickens et al. | 709/227 |
| 2010/0278336 A1* | 11/2010 | Tahan et al. | 380/46 |

(Continued)

OTHER PUBLICATIONS

ISO/IEC, Information Technology—Advanced Message Queuing Protocol (AMQP) v1.0 Specification, ISO/IEC 19464:2014(E), May 1, 2014.

*Primary Examiner* — Robert Hance
*Assistant Examiner* — Akshay Doshi
(74) *Attorney, Agent, or Firm* — Lorenz & Kopf LLP

(57) ABSTRACT

Systems, devices and methods are provided to deliver messages between a television distributor and groups of television receivers. A data processing system provides a message exchange service that routes messages to any number of queues based upon various routing keys. Each of the customer-operated television receivers establishes a queue with the routing service that is bound to any number of routing keys. Keys may be selected based upon characteristics of the receiver, geographic factors, demographic factors, subscribed services, customer preferences or the like. When a service wants to send a message to a particular group, it sends the message to the group's routing key, and the routing service delivers the messages to each of the receivers bound to that particular key.

12 Claims, 4 Drawing Sheets

(56) References Cited

U.S. PATENT DOCUMENTS

| | | | |
|---|---|---|---|
| 2012/0036529 A1* | 2/2012 | McClenny et al. | 725/33 |
| 2012/0246337 A1* | 9/2012 | Ross | H04L 45/308 709/238 |
| 2012/0278898 A1* | 11/2012 | Nguyen et al. | 726/27 |
| 2013/0024851 A1* | 1/2013 | Firman | G06F 8/60 717/170 |
| 2013/0318357 A1* | 11/2013 | Abraham | G06F 21/57 713/176 |

* cited by examiner

ADDRESSABLE REALTIME MESSAGING FOR TELEVISION RECEIVERS

TECHNICAL FIELD

The present disclosure generally relates to television receivers. More particularly, the following discussion relates to messaging between television service providers and any number of customer-operated television receivers.

BACKGROUND

Most current television viewers subscribe to a cable television or direct broadcast satellite (DBS) service to obtain their television content. Typically, the cable or DBS provider provides each subscriber with one or more set top boxes (STB) or similar television receiver devices that are able to receive and decode television content and to provide the decoded content to the viewer's television.

Many cable or DBS operators now support thousands or even millions of subscribers, most of whom have at least one television receiver device in their possession. These subscribers may be spread over a relatively wide geographic area, and may operate a variety of different models and versions of television receivers that provide any number of different features. Many operators would like to improve communicating with the customers and their receiver devices, and would especially like to provide messaging to groups of customer devices based upon their particular geography, demographics, receiver make/model, services used, or the like. This is currently very difficult due to various technical and logistical challenges.

It is therefore desirable to create systems, devices and methods for exchanging messages between a service provider and television receivers operated by subscribers. These and other desirable features and characteristics will become apparent from the subsequent detailed description and the appended claims, taken in conjunction with the accompanying drawings and this background section.

BRIEF SUMMARY

Various exemplary embodiments provide systems, devices and methods to exchange messages between a cable, DBS or other television service provider and the various receiver devices that are operated by the service's subscribers. In various embodiments, a data processing system provides a message exchange service that routes messages to any number of queues based upon various routing keys. Each of the customer-operated television receivers establishes a queue with the routing service that is bound to any number of routing keys. Keys may be selected based upon characteristics of the receiver, geographic factors, demographic factors, subscribed services, customer preferences or the like. When a service wants to send a message to a particular group, it sends the message to the group's routing key, and the routing service delivers the messages to each of the receivers bound to that particular key.

These and other embodiments, aspects and features are described in detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an example system for distributing messages between a television service provider and one or more television receivers;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a messaging service is provided to allow television service providers or the like to communicate with customer-operated set top boxes or other television receivers. Each television receiver is configured to execute a messaging client application that initially establishes its own queue with the messaging service. The receiver queue binds to any number of routing keys based upon particular attributes of the customer, the television receiver, and/or any service features used by the customer. An example queue may bind to keys associated with a city, state, ZIP code or other geographic identifier, for example. Other keys could represent the make and model of the receiver device (e.g., "VIP922", "Firmware5.2", etc.), or any features enabled on the receiver device (e.g., "HBO", "GoldContentPackage", "Place shifting", "RSDVR", etc.). Still other keys could represent demographics (e.g., male, female, married, single, senior, children in home, etc.) and/or any other factors as desired. In some embodiments, additional keys could be represent subscriber preferences (e.g., "BroncosFan", "ABCshareholder", "DenverWeather" or the like) so that the subscriber can receive messages providing updates on topics of interest. A television receiver's queue may therefore be bound to any number of different keys in the messaging service for receiving messages of any type that are intended for any number of different groups.

Each of the routing keys can be used to address a group of subscribers or receiver devices having common capabilities. The message service can conveniently route a common message to all of the subscribers in the same geographic area, for example, using the key for that particular city or ZIP code(s). The application that sends the message does not need to know any particular information or addresses about the receiving devices themselves, since the devices have previously associated themselves with keys representing the groups of messages they wish to receive. This allows a very high level of flexibility, since messages can now be conveniently sent to any number of recipient groups without sharing or disclosing addressing information about the devices themselves.

Figure 1:
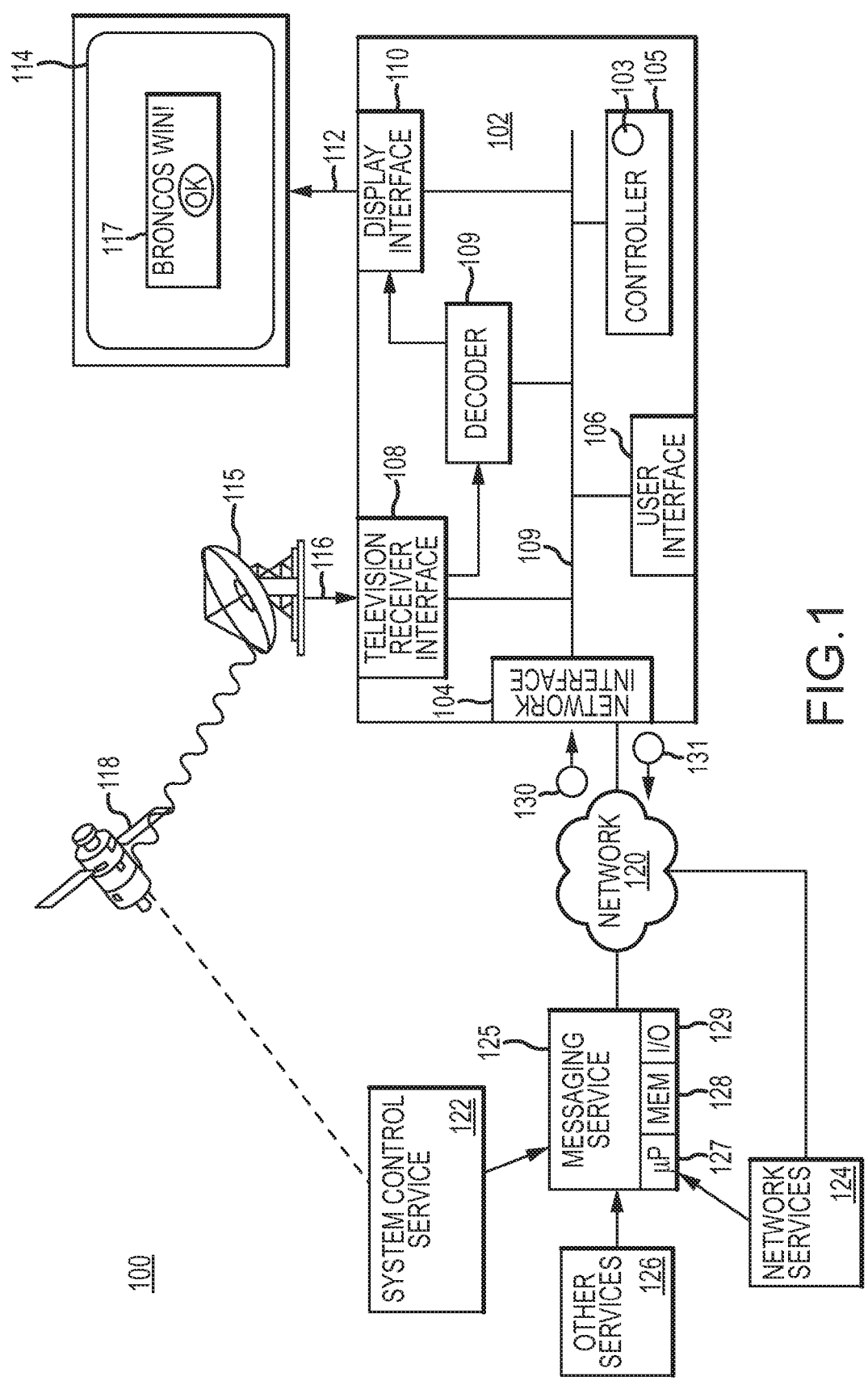

Turning now to the drawing figures and with initial reference to FIG. 1, an example of a system 100 for delivering messages to television receivers 102 is shown. System 100 is shown to include a messaging service 125 that routes messages from any number of services 122, 124, 126 to television receivers 102. Messaging service 125 may handle return messages from receivers 102 as well. Messages are transmitted over the Internet, a telephone network, or any other digital communications network 120 as desired.

Television receiver 102 may be implemented with any device capable of receiving and decoding television programming signals 116 for presentation on a television or other display 114. Typically, television receivers 102 are operated by subscribers to a DBS, cable, IPTV or similar television distribution service. Receivers 102 are therefore typically located at subscriber homes or other premises, which may cover a relatively wide geographic range (e.g., an entire nation or continent for a DBS operator, or a city, state or other region for a typical cable operator). Although FIG. 1 shows a single receiver 102 for clarity, in practice system 100 may incorporate hundreds, thousands or even millions of receivers 102 across any geographic area. The various receivers 102 may be of varying makes and models, and may have widely varying features and capabilities. Each of these receivers 102 may nevertheless be able to receive messages within system 100.

In the example shown in FIG. 1, receiver 102 receives television program signals 116 provided by a DBS operator via satellite 118. Equivalent embodiments could distribute programming 116 via a cable network, via network 120 (e.g., an IPTV, streaming video, video on demand or similar service), or via any other medium. For a DBS operator, in particular, messaging to the receivers 102 has been a substantial challenge due to the one-way nature of satellite broadcasts. Most modern DBS receivers 102, however, now have access to the Internet, a telephone network or another suitable back channel 120 that allows two-way communication with the receiver 102.

To that end, receiver 102 is shown to include hardware such as a network interface card or similar interface 104 for communicating on network 120; a user interface for interacting with a remote control, external buttons or other input features; and suitable hardware for processing received television signals. In a DBS system, for example, receiver 102 will typically include a receiver interface 108 that receives signals 116 from an antenna 115, although receiver interface 108 could equivalently receive signals 116 from a cable television or other source. Received signals 116 are decoded or otherwise processed at a decoder 109, and provided as an output 112 from a suitable display interface 112. Output signals 112 may be provided in any convenient format for presentation on a conventional television or other display 114. The various components of receiver 102 typically communicate using a conventional bus 107 or similar structure.

FIG. 1 shows receiver 102 as having a suitable controller 105 to direct and control the various functions of receiver 102. Controller 105 may incorporate any processor, memory and input/output features commonly found on a conventional microcontroller, microprocessor, digital signal processor or the like. In some implementations, the controller 105 could also decode content received from television interface 108, so the functions of controller 105 and decoder 109 could be combined. The various components and functions shown in FIG. 1 may be implemented in any other arrangement, using any desired combinations of components.

Controller 105 executes a messaging client 103 that manages incoming and outgoing messages on behalf of receiver 102. Messaging client 103 may be initially delivered to the receiver 102 via a firmware update or the like, and may be initiated at startup of the receiver 102 so that it operates as a thread or the like whenever receiver 102 is active, or at least whenever a connection to network 120 is active. Messaging client 103 suitably establishes a queue with messaging service 125 and binds the receiver's queue to any number of different message routing keys for receiving messages intended for different groups of subscribers or receivers 102. Additional detail about client application 103 and the various messaging functions is provided below.

In various embodiments, messages sent to client 103 are received and delivered to message handling threads that also execute on controller 105. In the example of FIG. 1, a message 130 sent to a "BroncosFan" key could be received at the queue associated with receiver 102 on messaging service 125. This message 130 would be received at client 103, and passed to a handler thread for taking any appropriate action, such as generating a notice 117 on display 114. In this example, a "Broncos win!" notice 117 is presented to the subscriber while he or she is watching television; similar concepts could be used to deliver other types of notices 117 to the customer, or to take other actions as desired. Other messages 130 received at client 103 could be processed internally by the receiver 102, for example, with or without the subscriber's knowledge; such messages could direct software or firmware updates, for example, or direct various components or features of receiver 102 to take other actions as desired.

To that end, message service 125 is a data processing system that handles messages 130 sent and received by any number of services 122, 124, 126 and any number of television receivers 102. Message service 125 typically operates using any conventional processor 127, memory 128 and input/output interfaces 129 for communicating on network 125, for receiving operator input, and/or the like. Message service 125 may be equivalently implemented using cloud processing resources, as desired.

The various services 122, 124, 126 are intended as examples of services that may wish to send messages 130 to receivers 102. Control and transmission service 122, for example, may wish to send notices of service outages, new services, or other events related to the delivery of television content 116. Such notices may be specific to geographic regions, receiver makes/models/software versions, subscription packages, or the like. Network service 124 may wish to send messages 130 relating to placeshifting, RSDVR or other streaming video applications, video on demand, and/or the like. Network service 124 may wish to contact a particular receiver 102, for example, to direct the receiver 102 to initiate a placeshifting session with a remote device. Such a message 130 might include a network address of the remote device so that the receiver 102 and the remote device can establish a direct placeshifting connection on network 120. Many other services 126 could be provided, and several examples of additional services 126 are described below.

Figure 2:
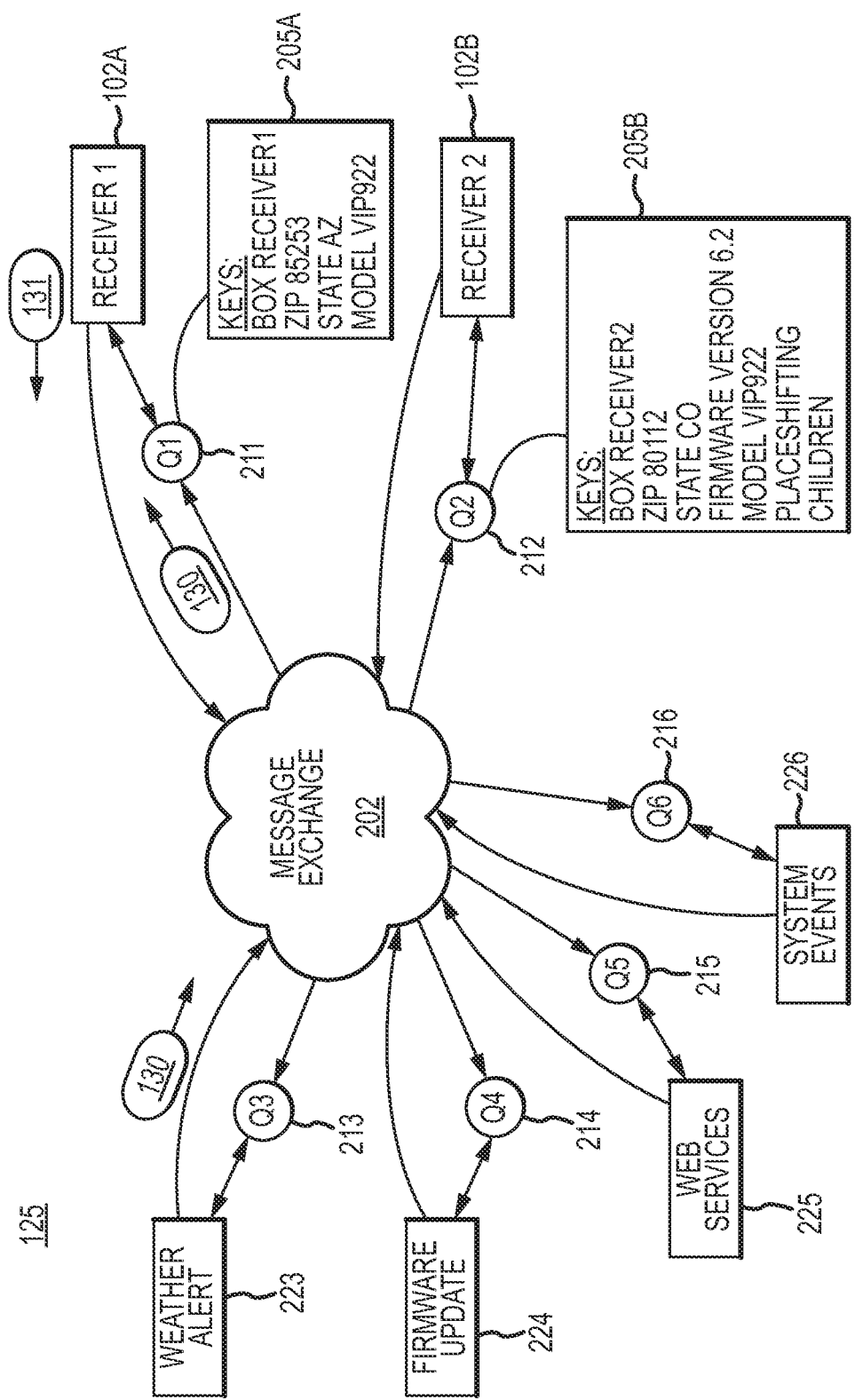
FIG. 2 is a block diagram of an example messaging system.

FIG. 2 provides additional detail about an example messaging service 125 that could be implemented using processor 127, memory 128, interfaces 129 and/or other computing resources as desired. With reference to FIG. 2, message service 125 suitably includes a message exchange 202 that receives messages 130 from any number of different services 223-226 and that routes the messages to various queues 211-216 based upon keys contained in the message 130. Each service 125 typically associates with a return queue for receiving return messages 131. FIG. 2, for example, shows queues 213-216 associated with services 223-226, respectively. The various services 223-226 could provide messages for any purpose, including weather alerts (service 223), firmware updates (service 224), web services (service 225), system outages or other events (service 226), and/or the like. Any number of additional services could make use of the message service 125 as desired.

As discussed above, television receivers 102A-B may be configured with a messaging client 103 or the like that establishes a queue 211, 212 with messaging service 125 for receiving messages. The client 103 registers with the message exchange 202 and binds with any number of routing keys 205A, 205B, as desired. The particular keys 205 each represent a group of one or more receivers 102 that can be recipients of messages 130. To that end, each receiver 102 will typically bind its queue 205 to keys associated with the receiver's unique identifier (e.g., "BoxReceiver1", "BoxReceiver2" in FIG. 2), as well as keys for any additional groups that the receiver 102 or the subscriber wants to join. As noted above, keys may be associated with geographic features (e.g., ZIP code, city, state, neighborhood, etc.), demographic features (e.g., children in home, seniors, male, female, etc.), subscriber preferences (e.g., "SportsFan", "BroncosFan", "SciFiFan", etc.), or the like. In many implementations, the receiver 102 will also bind to keys corresponding to the make and model of the receiver 102 (e.g., "VIP922"), the version of software or firmware currently in use (e.g., "FirmwareVersion6.2"), and any special features supported by the receiver 102 (e.g., "placeshifting", "RSDVR", etc.). Additional keys can be added for any purpose to support any number of desired applications and services.

When a message 130 is sent to a particular key, then, message exchange 202 suitably routes the message 130 to all of the queues 211-216 that have previously bound to that particular key. It is not necessary for the message sender to know the addresses or identifiers of individual receivers 102; it is sufficient that the message 130 is sent to a key that is associated with the group. Message exchange 202 may be implemented using, for example, an open source or commercial messaging platform such as the RABBITMQ platform available from VMWare Inc. of Palo Alto, Calif. or the like. Many different message routing platforms are available from other sources, and any of these could be equivalently used in different embodiments.

Messages 130 are transferred from the queues 211-212 to client applications 103 executing on receivers 102A-B in any manner. In various embodiments, messages are "pushed" from the queues 211-212 to the clients 103 at regular intervals or in real time, as desired. Alternately, the client applications 103 can be configured to poll their associated queues 211-212 at regular or irregular intervals to check if messages are waiting. Message delivery could vary from embodiment to embodiment, receiver to receiver and even message to message depending upon the application, the urgency of the message, and the communications architecture that is available.

Figure 3:
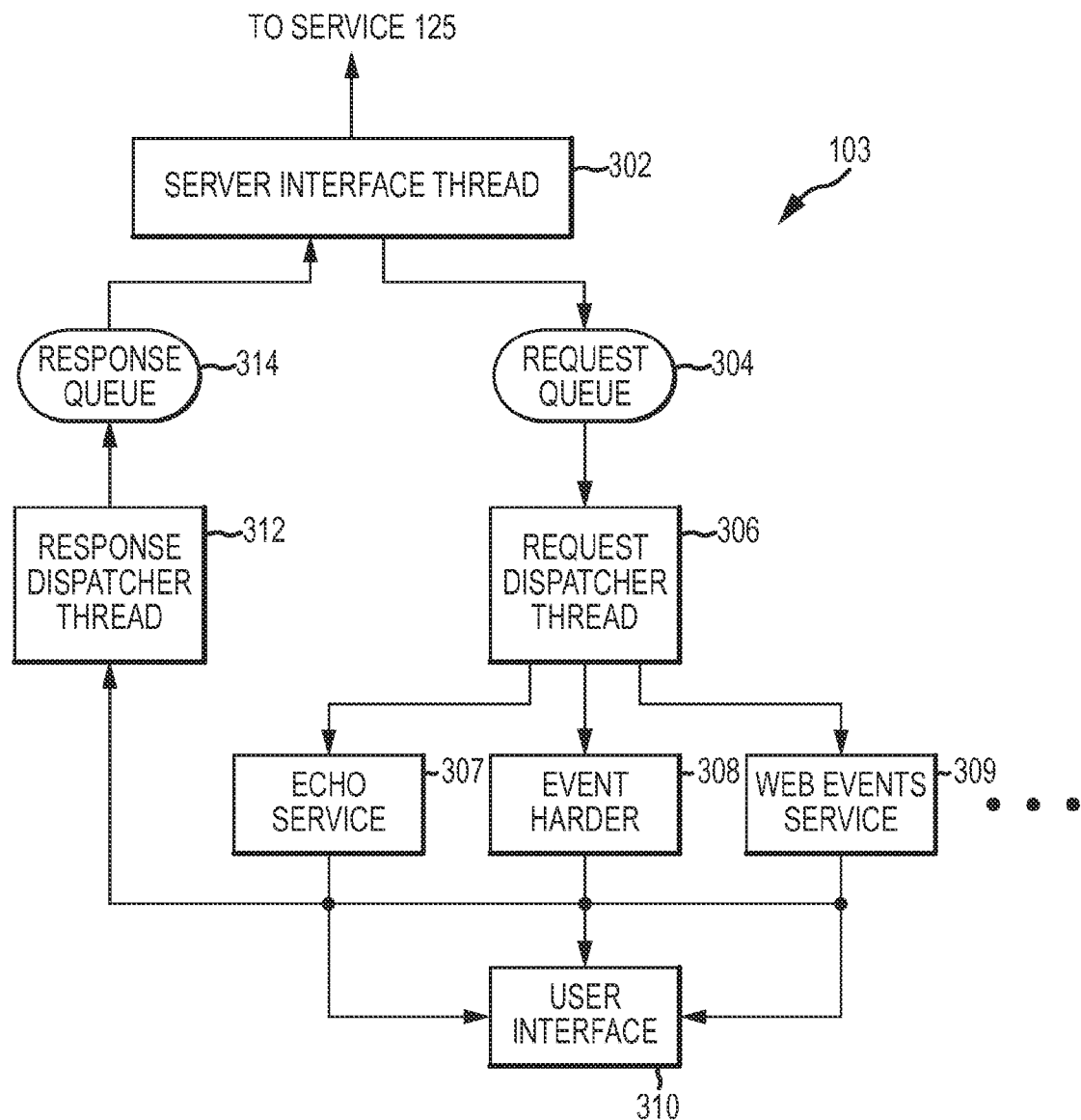
FIG. 3 is a block diagram of an example client-side application for processing messages by a television receiver.

Turning now to FIG. 3, an example of a messaging client 103 that can be executed on controller 105 or elsewhere on receiver 102 is shown. Messaging client 103 may be implemented as a software application or module of any sort that can be stored in memory or other non-transitory storage, and that executes on conventional processing hardware. Some or all of messaging client 103 may be obtained from a commercial vendor, such as the same vendor that distributes message exchange 202 above.

As illustrated in FIG. 3, messaging client 103 suitably include a server interface thread 302, request queue 304, response queue 314, request and response dispatcher threads 306, 312 (respectively), and any number of service handler modules 307, 308, 309 as desired. The various functions and modules may be arranged differently or supplemented in other embodiments.

Server interface thread 302 suitably interacts with queue 211 and/or message exchange 202 on message server 125 to send and receive messages 130, 131 as desired. Server interface thread 302 may be configured to poll for messages 130 on the queue 211 associated with receiver 102, or to receive messages 130 that are pushed in real time or on any time interval from queue 211.

Incoming messages 130 are initially placed in a request queue 304 for handling by a request dispatcher thread 306. Request dispatcher 306 suitably routes the incoming messages 130 to the appropriate message handling logic, such as modules 307, 308, or 309. The messages may be routed based upon the routing key, or upon any other information contained in the message 130. Messages could contain a message identifier, for example, that indicates an appropriate recipient service for the particular message 130.

Various applications or other message handling modules 307, 308, 309 may be provided to process messages 130 and/or to execute other actions based upon the received messages. In the example of FIG. 3, an echo service module 307 simply listens for messages and then transmits an acknowledgement reply. This service 307 may be useful for testing purposes, since it could verify the integrity of the communications channel between the client and the server. The echo service also verifies that the receiver 102 is turned on, active on the network 120, and able to receive messages 130 using system 125.

FIG. 3 also shows an "event handler" service 308 that generates notices 117 or that takes other actions specified by the various messages 130. Event handler 308 may access a display interface, input interface or the like to interact with the subscriber, the remote control, and/or the display 115, as desired.

As noted above, a "web handler" service 309 could be provided to process commands received from a web control interface or the like. Messages 130 could include instructions to respond to a web-based remote control service (e.g., to change the channel being displayed), a placeshifting service, or another network service 124 as desired. Again, any number of additional features or services could be implanted that could make use of the messaging services described herein.

Various embodiments further allow services 307-309 executing on receiver 102 to transmit messages 131 using the messaging system 125. Some of the services 223-226 using system 125 may request acknowledgement or other follow-up messages, for example. Typically, incoming messages 130 that request a follow up reply 131 could include a routing key usable by message exchange 202 to deliver the reply 131 to an appropriate queue 213-216 that is associated with the requesting service. Each service 307-309 in receiver 102 wishing to transmit a message 131 suitably provides the message content and routing key for the recipient to a response dispatcher thread 312, which places the outgoing message 131 into a response queue 314. The server interface thread 302 then transfers the outgoing messages 131 from queue 314 to the message exchange 202 on service 125, as appropriate.

Figure 4:
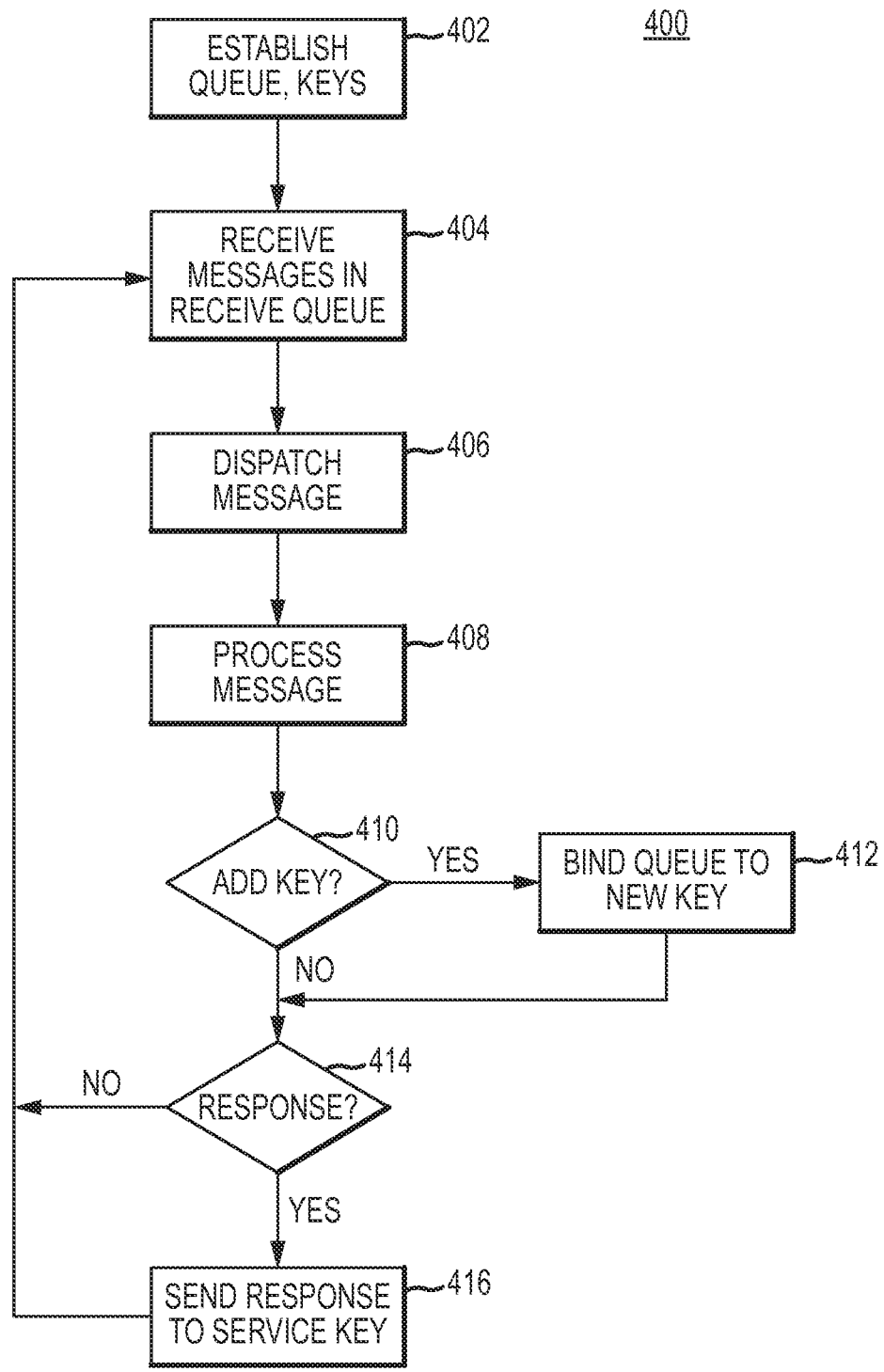
FIG. 4 is a flowchart of an example method executable by a television receiver to process received messages.

FIG. 4 is a flowchart showing an example of a process 400 executed by receiver 102. Process 400 may be executed by messaging client 103 and any associated applications, modules or other logic executing on controller 105, for example. Alternate embodiments may implement the various functions shown in FIG. 4 using other modules or other logic, as desired.

Receiver 102 initially establishes its queue 211 with messaging service 125 (function 402). The queue 211 may be established at startup of the receiver 102, or at any other appropriate time. In various embodiments, the queue 211 is persistent even when receiver 102 is turned off or is unavailable on network 120 so that incoming messages 130 can be held in the queue 211 until such time as receiver 102 is able to obtain and process them.

Receiver 102 also binds any number of routing keys 205 to its queue 211. As noted above, the receiver 102 will typically bind to a key that is based upon a unique identifier associated with the receiver 102, as well as any other keys that can be readily determined. Other keys 205 can be added to the queue 211 as they are discovered in software updates, subsequent messages, or in any other manner. Some embodiments may also allow the subscriber to indicate keys or to subscribe to optional features that may be associated with their own keys, as described above.

Incoming messages 130 are received from queue 211 as appropriate (function 404). As noted above, the server interface thread 302 receives the messages according to any appropriate temporal scheme; messages 130 may be "pushed" by the messaging service 125 and/or polled by the receiver 102, as desired for the particular application. Received messages 130 are temporarily stored in the request queue 304 for retrieval and routing by request dispatcher thread 306 (function 406).

Request dispatcher thread 306 passes the incoming messages 130 on queue 304 to their appropriate destinations on receiver 102 (function 406). Messages 130 may be passed to the available services 307-309 based upon their routing keys or other identification data contained within the messages 130.

Incoming messages are processed in any appropriate manner, based upon the type of message 130 and the particular application (function 408). As noted above, messages 130 could prompt notices 117 to the subscriber on display 114 (e.g., "Broncos win!", "Tornado! Take shelter!", "Service outage planned for tonight", etc.). Other messages 130 could be used to provide data or updates to various applications or other features operating on receiver 102, such as placeshifting, DVR/RSDVR services, and/or the like. Still other messages 130 could be processed internally by the receiver 102 for any purpose.

Some incoming messages 130 may provide additional routing keys 205 that the receiver 102 may wish to bind to (function 410). If so, then the service handling the message will typically instruct server interface thread 302 to establish the new binding to the new key with message exchange 202. Other embodiments could format outgoing messages 131 directed to an appropriate service queue to establish the binding, or the binding could be accomplished in any other manner desired.

As noted above, some messages 130 may request responses 131, or a service 307-309 may wish to generate an outgoing message 131 to a service queue 213-216 on message system 225 (function 414). In such embodiments, the data for the message 131 and the desired routing key associated with the recipient is forwarded to the response dispatcher 312, which stores the outgoing message 131 on the outgoing queue 314 for eventual delivery to message exchange 202 by server interface thread 302 (function 416). If the receiver 102 is temporarily unable to reach network 120 for any reason, then messages 131 may be stored in the outgoing queue 314 until server interface 302 is able to process them.

The various functions and modules described herein may be modified in any manner, or supplemented as desired.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A data processing system to deliver messages from one or more services to a plurality of customer-operated television receivers each having a common attribute, the data processing system comprising:
   an interface to a network; and
   a processor configured to provide a message exchange service and a plurality of queues within the data processing system, wherein each of the customer-operated television receivers is associated with one of the plurality of queues in the data processing system, wherein each of the plurality of queues is bound to one or more routing keys for receiving messages within the data processing system, and wherein the message exchange service is configured to route messages to each of the plurality of queues in the data processing system based upon the routing keys contained in the messages so that each of the messages is delivered to each of the one or more queues that are associated with the routing keys contained in the message for subsequent delivery from the data processing system to the customer-operated television receiver that is associated with the queue, and wherein the queues associated with each of the plurality of customer-operated television receivers having the common attribute are all associated with a single routing key, and wherein the processor uses the single routing key that is bound to the queues associated with each of the television receivers having the common attribute to simultaneously deliver software update messages to each of the customer-operated television receivers having the common attribute, and wherein at least some of the messages comprise a return routing key that is bound to a particular return queue of a plurality of return queues, each of the plurality of return queues being associated with one of the one or more services, to thereby request that the customer-operated television receivers provide a follow-up reply to the service using the return routing key.

2. The data processing system of claim 1 wherein the common attribute is a common version of a software program.

3. The data processing system of claim 1 wherein each of the one or more routing keys defines a group of message recipients based upon a common attribute of the message recipients.

4. The data processing system of claim 1 wherein the common attribute is a physical attribute of the customer-operated television receiver.

5. The data processing system of claim 1 wherein
   the common attribute is a demographic attribute of an operator of the customer-operated television receiver.

6. The data processing system of claim 1 wherein the common a geographic identifier, and wherein queues associated with each of the plurality of customer-operated television receivers registered in the same geographic identifier are all associated with a single key, and wherein the processor uses the single key to simultaneously provide messages to each of the customer-operated television receivers registered in the same geographic identifier.

7. The data processing system of claim 1 wherein the queues associated with each of the plurality of customer-operated television receivers having the common attribute are all associated with a single key, and wherein the processor uses the single key to simultaneously provide messages to each of the customer-operated television receivers having the common attribute.

8. The data processing system of claim 1 wherein each of the plurality of message queues are bound to one or more of the routing keys within the data processing system, wherein each of the one or more routing keys represents a subset group of the plurality of customer-operated television receivers.

9. A method executable by a data processing system to deliver messages from a television broadcaster to a plurality of customer-operated television receivers each having shared attributes, the method comprising:
  establishing a plurality of message queues, wherein each message queue is associated with one of the plurality customer-operated television receivers so that the message queue receives messages at the data processing system on behalf of the associated customer-operated television receiver;
  binding each of the plurality of message queues to one or more routing keys within the data processing system, wherein each of the one or more routing keys represents a subset group of the plurality of customer-operated television receivers having a common value of at least one of the shared attributes; and
  routing messages from one or more services within the data processing system to the subset groups of the plurality of customer-operated television receivers using the routing keys so that the messages are delivered from the one or more services to each of the queues associated with customer-operated television receivers in the subset group, wherein messages received at each of the queues are subsequently transferred from the data processing system to the customer-operated television receivers associated with each of the queues, wherein the queues associated with each of the plurality of customer-operated television receivers having the same common value of the at least one shared attribute are all bound to a single routing key, and wherein the data processing system uses the single routing key that is bound to the queues associated with each of the customer-operated television receivers in the subset group to simultaneously provide messages to each of the customer-operated television receivers having the common value of the at least one shared attribute, and wherein at least some of the messages comprise a return routing key that is bound to a particular return queue of a plurality of return queues, each of the plurality of return queues being associated with the one or more services, to thereby request that the customer-operated television receivers provide a follow-up reply to the one or more services using the return routing key.

10. The method of claim 9 the at least one shared attribute comprises a version of a software program, and the customer operated television receivers having the same common value of the at least one shared attribute are customer operated television receivers executing a same version of the software program.

11. The method of claim 9 wherein at least one of the one or more services is associated with the return queue that is associated with the return routing key, and wherein the routing comprises routing return messages received from customer-operated television receivers to the return queue based upon the return routing key.

12. The method of claim 9 wherein at least one of the subset groups represents the customer-operated television receivers that are registered in a common geographic area, and wherein messages routed to the routing key associated with the group simultaneously provide information to each of the customer-operated television receivers registered in the common geographic area.

* * * * *